United States Patent
Matras

(10) Patent No.: US 11,247,614 B2
(45) Date of Patent: Feb. 15, 2022

(54) DETACHABLE FOOTREST ASSEMBLY FOR A VEHICLE

(71) Applicant: Elements Automotive, LLC, Abilene, TX (US)

(72) Inventor: Michael S. Matras, Abilene, TX (US)

(73) Assignee: Elements Automotive, LLC, Abilene, TX (US)

( * ) Notice: Subject to any disclaimer, the term of this patent is extended or adjusted under 35 U.S.C. 154(b) by 76 days.

(21) Appl. No.: 16/684,659

(22) Filed: Nov. 15, 2019

(65) Prior Publication Data
US 2020/0189472 A1 Jun. 18, 2020

Related U.S. Application Data

(60) Provisional application No. 62/769,098, filed on Nov. 19, 2018.

(51) Int. Cl.
*B60R 3/00* (2006.01)
(52) U.S. Cl.
CPC .................. *B60R 3/007* (2013.01)
(58) Field of Classification Search
CPC .................. B60R 3/00; B60R 3/007
See application file for complete search history.

(56) References Cited

U.S. PATENT DOCUMENTS

| | | | | |
|---|---|---|---|---|
| 7,267,384 B1 * | 9/2007 | Coviello | ............... | B60R 1/078 296/1.11 |
| 7,390,003 B1 * | 6/2008 | Sylvia | ................ | B60R 3/007 280/163 |
| 7,980,345 B1 * | 7/2011 | Harvey | ................ | B60N 3/06 180/90.6 |
| 9,475,432 B1 * | 10/2016 | Rauschert | ............... | B60R 3/007 |
| 2019/0275952 A1 * | 9/2019 | Bennett | ................ | B60R 11/00 |

* cited by examiner

*Primary Examiner* — Bryan A Evans
(74) *Attorney, Agent, or Firm* — John J. Patti; Patti Pershem, PLLC

(57) ABSTRACT

A detachable footrest assembly is provided. The assembly includes a frame having a first portion and a second portion. A footrest extends from the first portion of the frame. A first mount positioned such that the first mount is adapted to be received into a lower door hinge of a vehicle with a first pin that extends from a first mating portion which is threaded and which extends in a direction away from the first portion of the frame. A second mount is spaced apart from the first mount and positioned such that the second mount is adapted to be received into an upper door hinge of a vehicle with a second pin that extends from a second mating portion which is threaded and which extends in a direction away from the first portion of the frame. The first and second pins are substantially aligned.

18 Claims, 7 Drawing Sheets

DETACHABLE FOOTREST ASSEMBLY FOR A VEHICLE

CROSS-REFERENCE

This application claims priority to U.S. patent application Ser. No. 62/769,098 by Michael S. Matras, which was entitled "DETACHABLE FOOTREST ASSEMBLY FOR A VEHICLE," and was filed on Nov. 19, 2018. This application is incorporated by reference for all purposes.

TECHNICAL FIELD

The invention relates generally to aftermarket vehicle parts and, more particularly, to a detachable footrest that is adapted to be secured to door hinges.

BACKGROUND

Modification of vehicles (particularly off-road vehicles) with aftermarket parts is commonplace. The JEEP® brands is a popular brand that is often modified, and some vehicles (including the JEEP® brands) have removable doors. After the doors are removed, other assemblies can be secured within remaining hinges that are secured to the chassis of the vehicle. U.S. Pat. No. 7,980,345 shows the use of a detachable footrest which essentially rests in the hinges under the force of gravity. One particular problem with this configuration shown in U.S. Pat. No. 7,980,345 is that stability is based on the force gravity, which may be irregular in a moving, off-road vehicle. Thus, there is a need for an improved detachable footrest assembly for a vehicle.

SUMMARY

An embodiment of the present disclosure, accordingly, provides an apparatus. The apparatus comprises: a frame having a first portion and a second portion, there the first portion has a first end and a second end, and wherein the first portion extends from the second portion at the first end; a footrest extending from the first portion of the frame; a first mount positioned such that the first mount is adapted to be received into a lower door hinge of a vehicle, wherein the first mount has: a first mating portion that extends from the frame proximate to the first portion of the frame; and a first pin that extends from the first mating portion and that is threaded at its distal end, wherein the first pin extends in a direction away from the first portion of the frame; a second mount that is spaced apart from the first mount and positioned such that the second mount is adapted to be received into an upper door hinge of a vehicle, wherein the second mount has: a second mating portion that extends from the frame; a second pin that extends from the second mating portion and that is threaded at its distal end, wherein the second pin extends in a direction away from the first portion of the frame, and wherein the first and second pins are substantially aligned; a third mating portion that extends from the frame, wherein the second and third mating portions at positioned at an angle to one another; and a third pin that extends from the third mating portion.

In accordance with an embodiment of the present disclosure, the frame further comprises a third portion that extends from the first portion at the second end.

In accordance with an embodiment of the present disclosure, the frame further comprises a reinforcing portion that extends between the first and third portions of the frame.

In accordance with an embodiment of the present disclosure, the first and third portions are generally parallel to one another and perpendicular to the second portion, and wherein the frame is formed from a rod.

In accordance with an embodiment of the present disclosure, the apparatus further comprises a third mount that is secured to the third portion of the frame at its distal end, wherein the third mound is adapted to be coupled to a mirror.

In accordance with an embodiment of the present disclosure, the third mount further comprises: a main body having an opening; and a ball joint pin secured in the opening of the main body.

In accordance with an embodiment of the present disclosure, the first, second, and third mating portions are secured to the second portion of the frame by welding, brazing, or gluing.

In accordance with an embodiment of the present disclosure, the footrest is secured by welding, brazing, or gluing.

In accordance with an embodiment of the present disclosure, an apparatus is provided. The apparatus comprises: a generally L-shaped frame having a lower portion and an intermediate portion; a footrest that is secured to lower portion for the frame; a lower bracket that is positioned such that it is adapted to engage a lower door hinge of a vehicle; a second bracket that is spaced apart from the first bracket and positioned such that the second bracket is adapted to be received into an upper door hinge of a vehicle, and wherein the first and second brackets are substantially aligned, wherein each of the upper and lower brackets have: a first portion that is secured to the intermediate portion of the frame; a second portion that extends from the first portion of the corresponding bracket in a direction away from the lower portion of the frame; and a third portion that extends from the second portion of the corresponding bracket, wherein the third portion is threaded; a third bracket that is secured to the intermediate portion of the frame proximate to the second bracket and secured at an angle to the second bracket, wherein the third bracket includes: a first portion that is secured to the intermediate portion of the frame; and a second portion that extends from the first portion of the third bracket.

In accordance with an embodiment of the present disclosure, the frame is generally U-shaped with an upper portion that is generally parallel to the lower portion.

In accordance with an embodiment of the present disclosure, the apparatus further comprises a reinforcement that secured to the upper and intermediate portions of the frame at the corner between the two.

In accordance with an embodiment of the present disclosure, the apparatus further comprises a mirror mount that is secured to the upper portion of the frame.

In accordance with an embodiment of the present disclosure, the mirror mount further comprises: a main body having an opening; and a ball joint pin secured in the opening of the main body.

In accordance with an embodiment of the present disclosure, the frame is comprised of a rod, which is bent to form the lower and intermediate portions.

In accordance with an embodiment of the present disclosure, the first, second, and third brackets are formed of rods that are bent to form their respective first and second portions.

In accordance with an embodiment of the present disclosure, the first, second, and third brackets are secured by welding, brazing, gluing, or bolting.

In accordance with an embodiment of the present disclosure, an apparatus is provided. The apparatus comprises: a first bar that is bent to form a generally U-shaped frame with a lower portion, an upper portion and a lower portion; a footrest that is welded to the power portion of the frame; a reinforcement that is welded to the frame at the corner between the intermediate and upper portions; second and third bars that each have first and second ends, wherein each of the second and third bars has a bend at its first end which is welded to the intermediate portion of the frame, and wherein each of the second and third bars is threaded a long at least a portion of its length, and wherein the second and third bars are position such that the second and third bars, respectively, are adapted to be received into upper and lower door hinges of a vehicle, and wherein the second and third bars are substantially aligned with one another, and wherein the second and third bars point in a direction away from the lower portion of the frame; and a fourth bar having first and second ends, wherein the fourth bar has a bend at its first end which is welded to the intermediate portion of the frame at position proximate to and at an angle to the second bar.

In accordance with an embodiment of the present disclosure, the footrest is substantially rectangular.

In accordance with an embodiment of the present disclosure, the mirror mount further comprises: a substantially rectangular body that is welded to the upper portion of the frame, wherein the body includes a port; and a ball joint pin secured in the opening of the body.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 2:
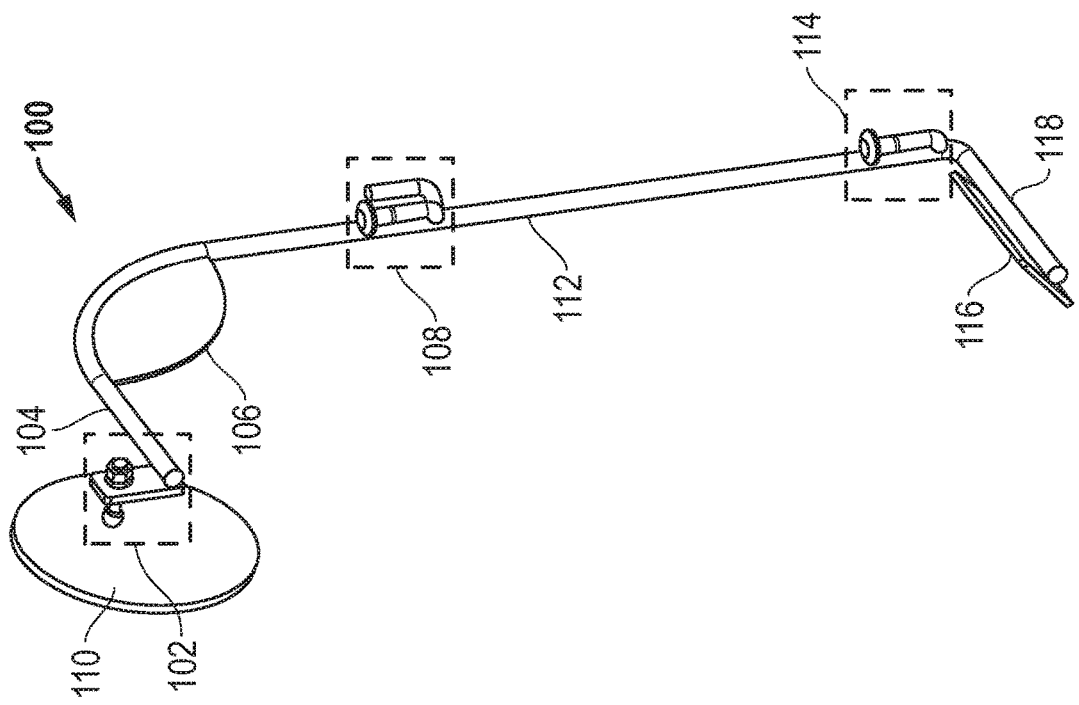
FIGS. 1 and 2 are isometric views of the detachable footrest assembly in accordance with the present disclosure.

Refer now to the drawings wherein depicted elements are, for the sake of clarity, not necessarily shown to scale and wherein like or similar elements are designated by the same reference numeral through the several views.

Figure 1:
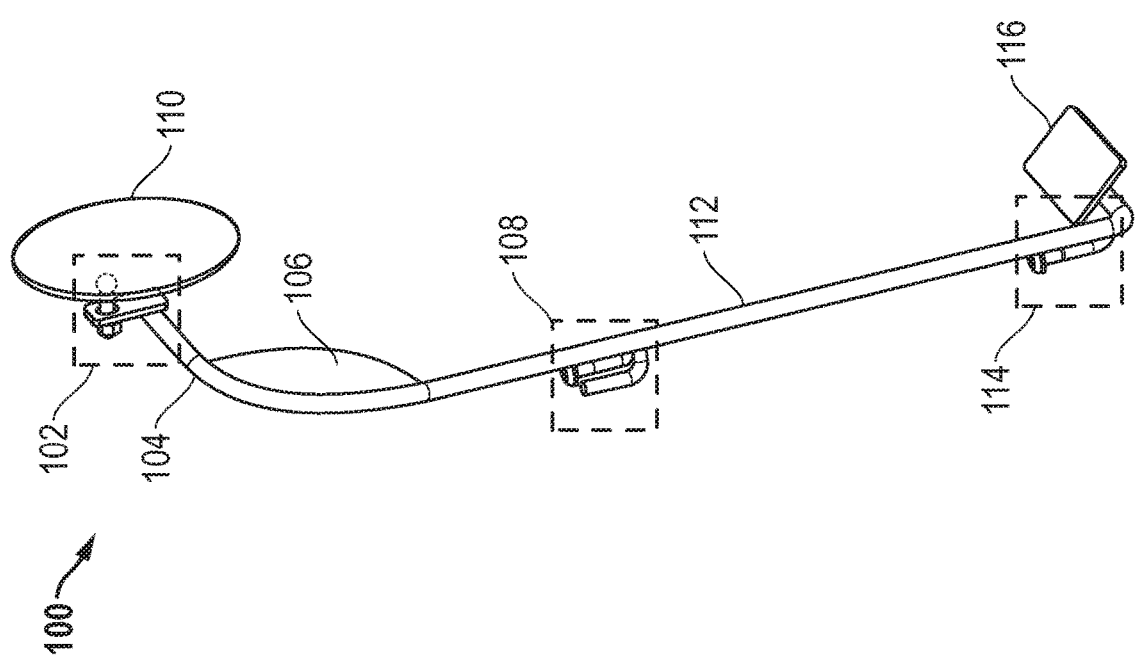
Figure 3:
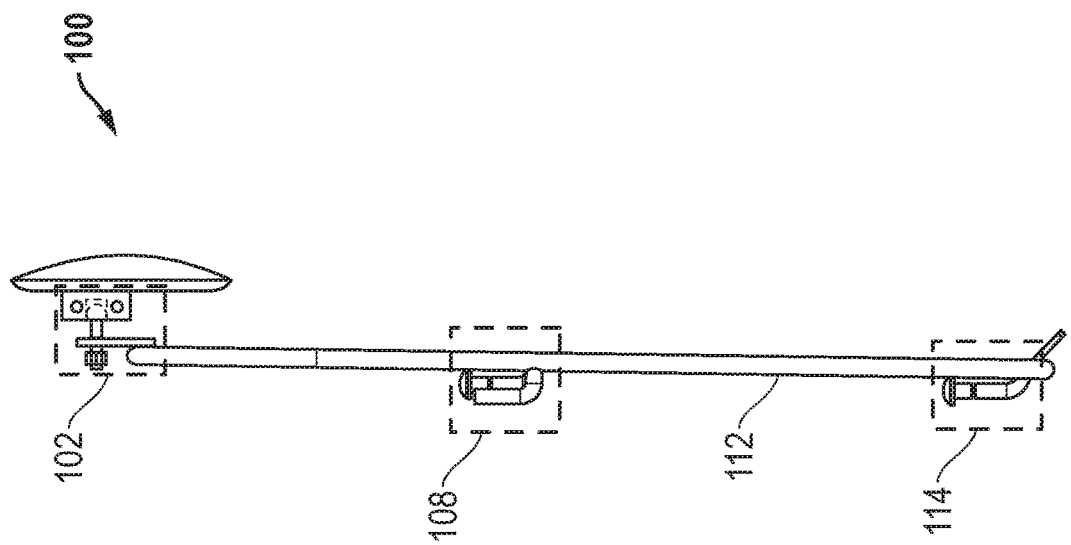
FIGS. 3 and 4 are side views of the detachable footrest assembly of FIGS. 1 and 2.
Figure 4:
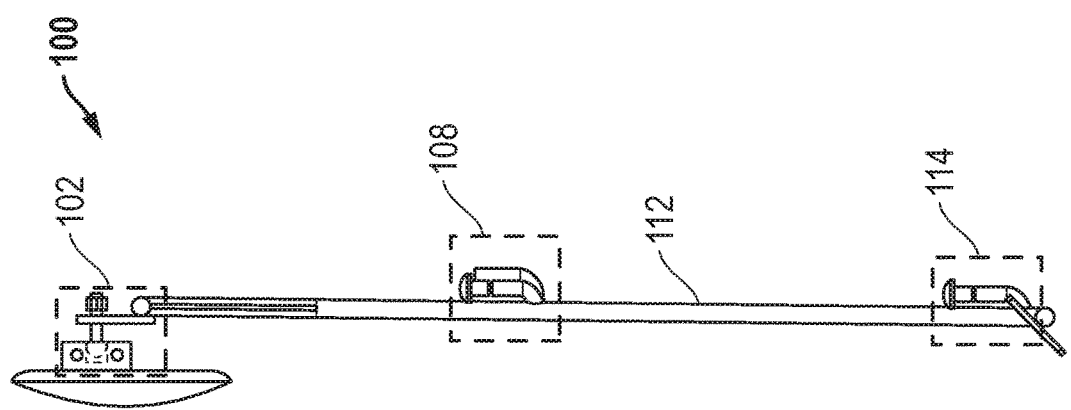
Figure 6:
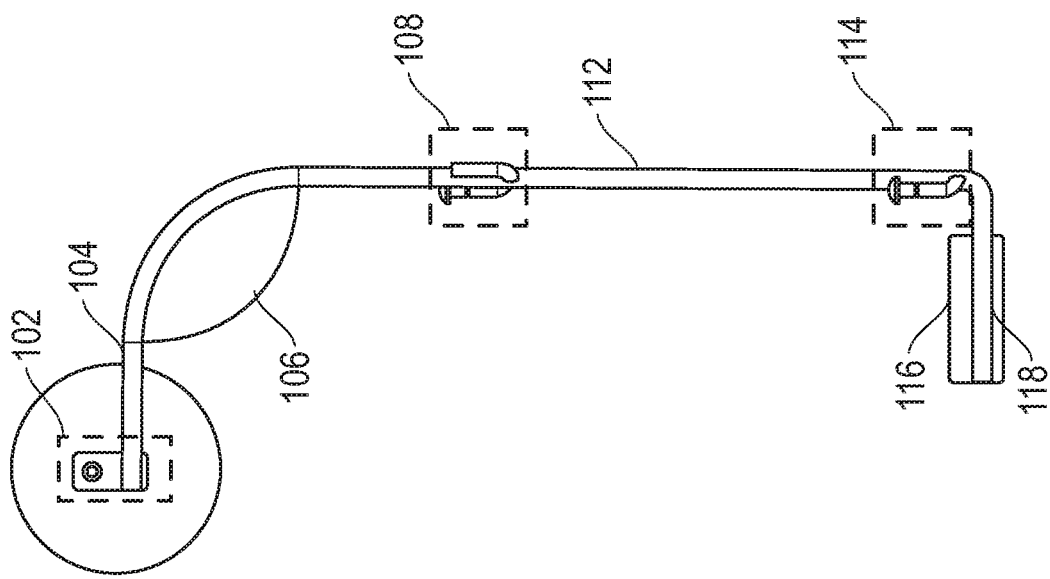
FIG. 6 is a front view of the detachable footrest assembly of FIGS. 1 and 2.
Figure 5:
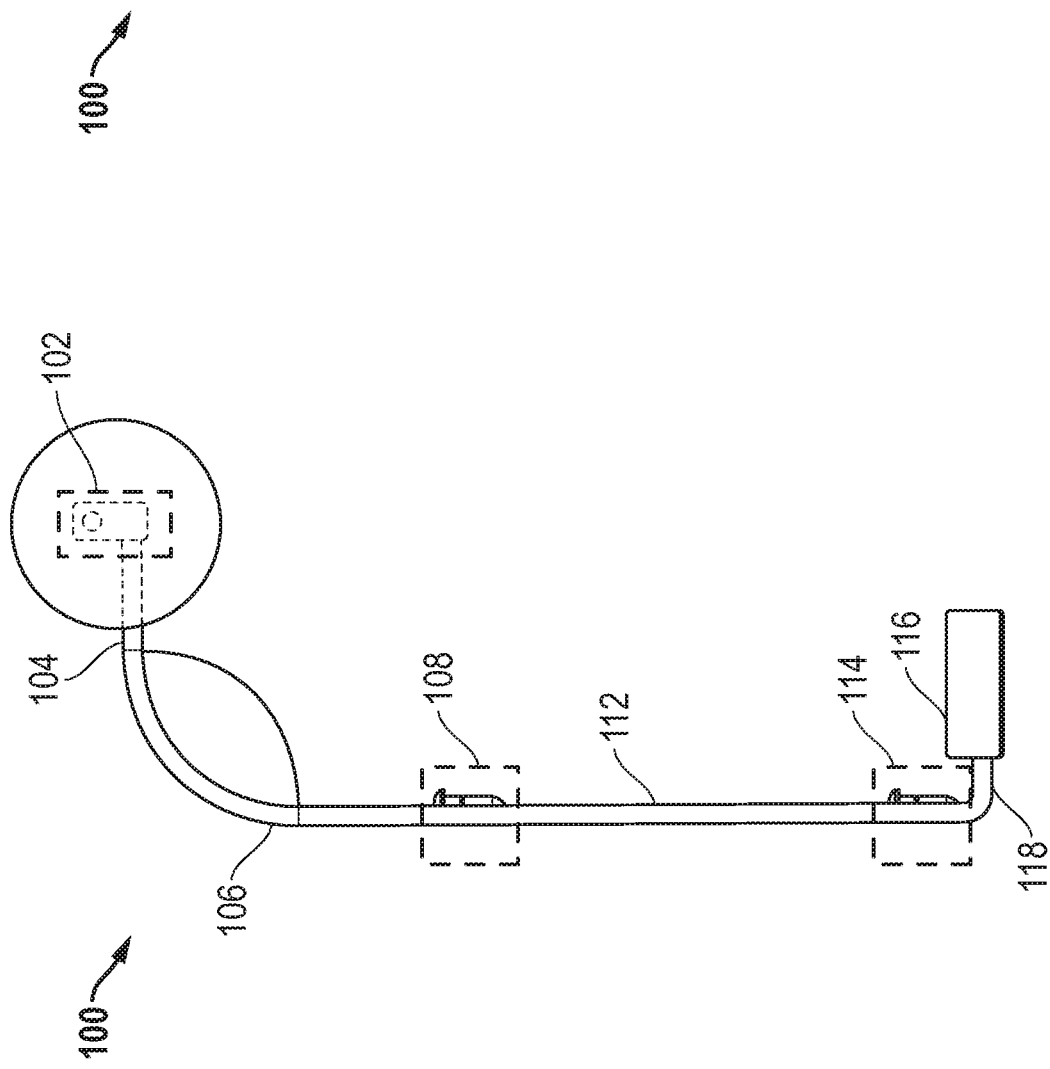
FIG. 5 is a rear view of the detachable footrest assembly of FIGS. 1 and 2.
Figure 8:
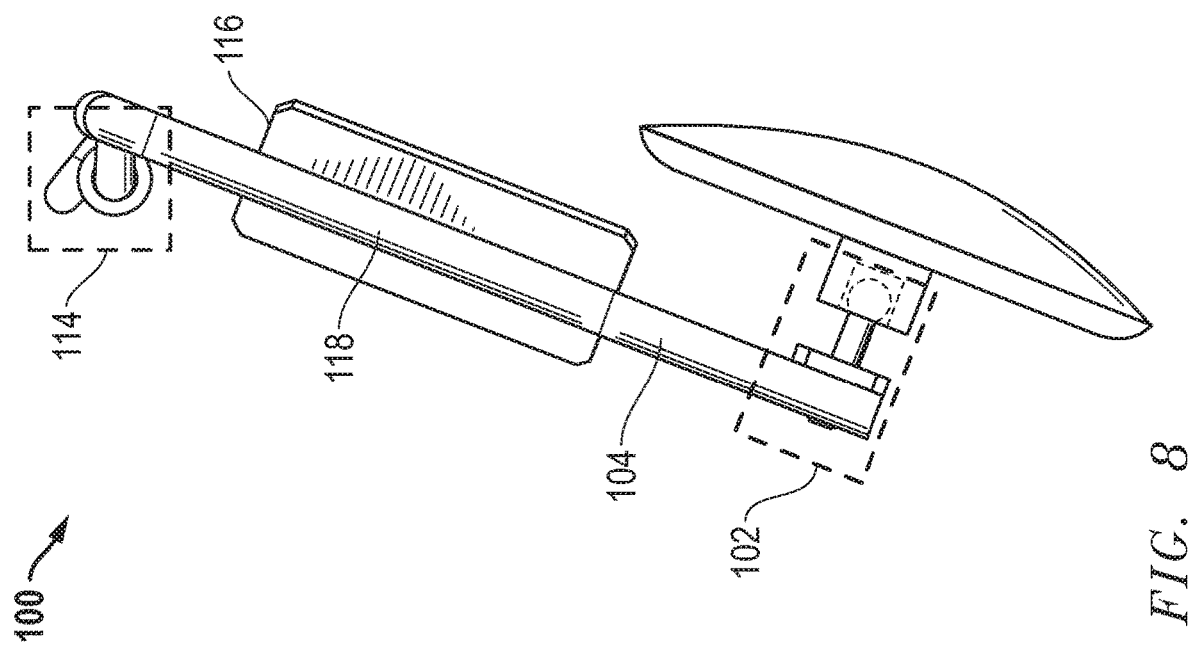
FIG. 8 is a bottom view of the detachable footrest assembly of FIGS. 1 and 2.
Figure 7:
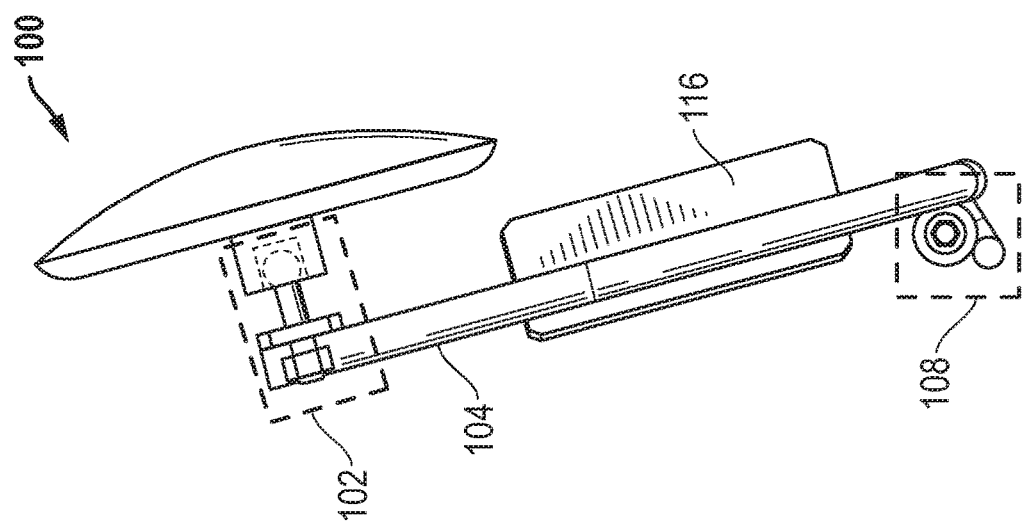
FIG. 7 is a top view of the detachable footrest assembly of FIGS. 1 and 2.
Figure 10:
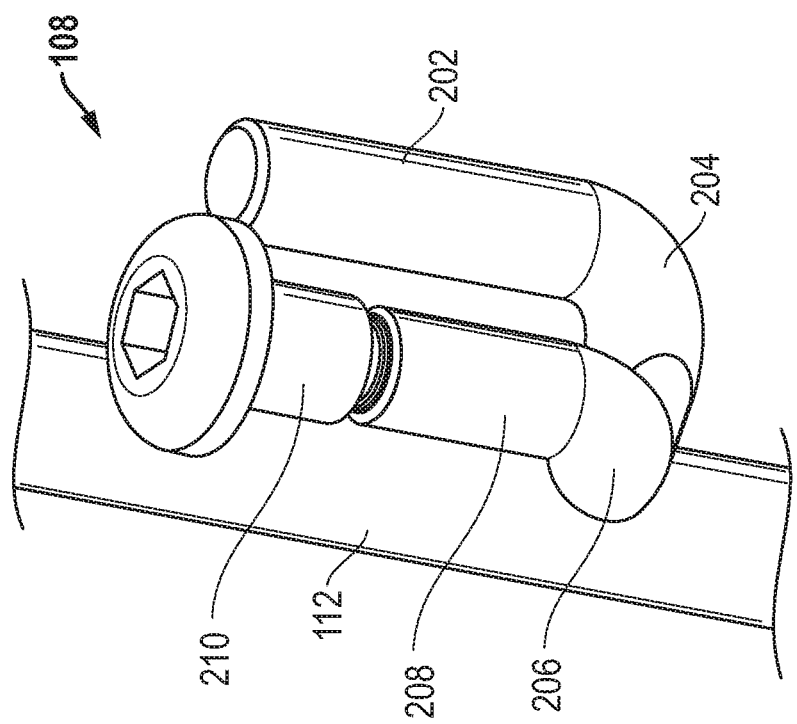
FIGS. 9 and 10 are more detailed views of the upper mount of the detachable footrest assembly of FIGS. 1 and 2.
Figure 9:
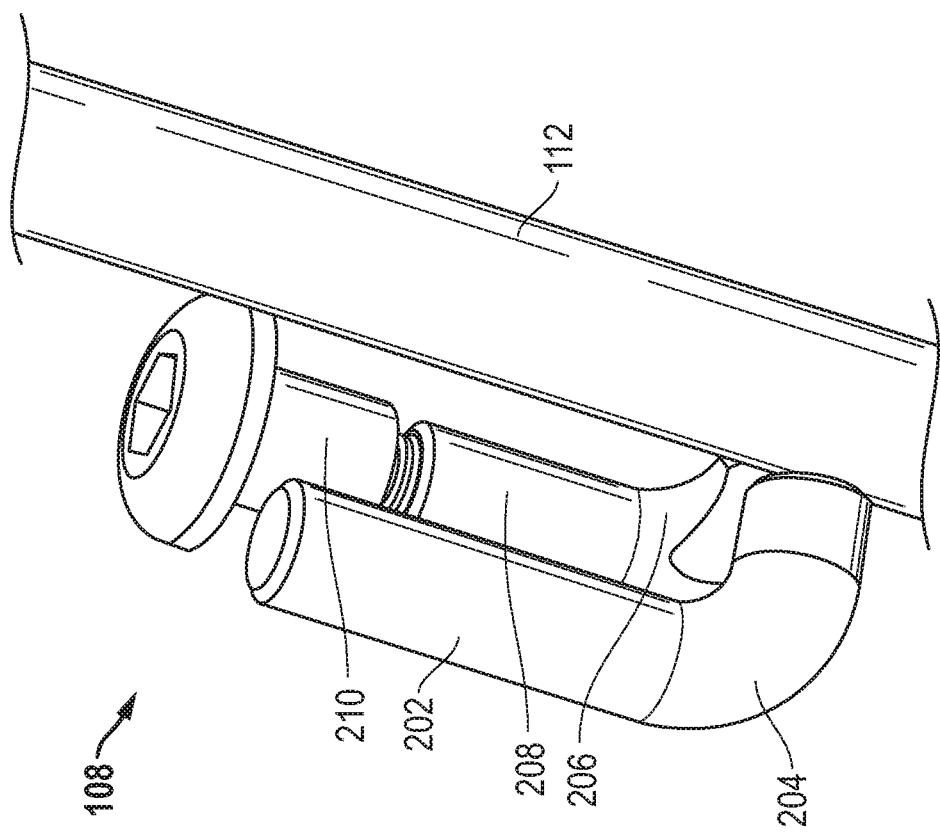
Figure 12:
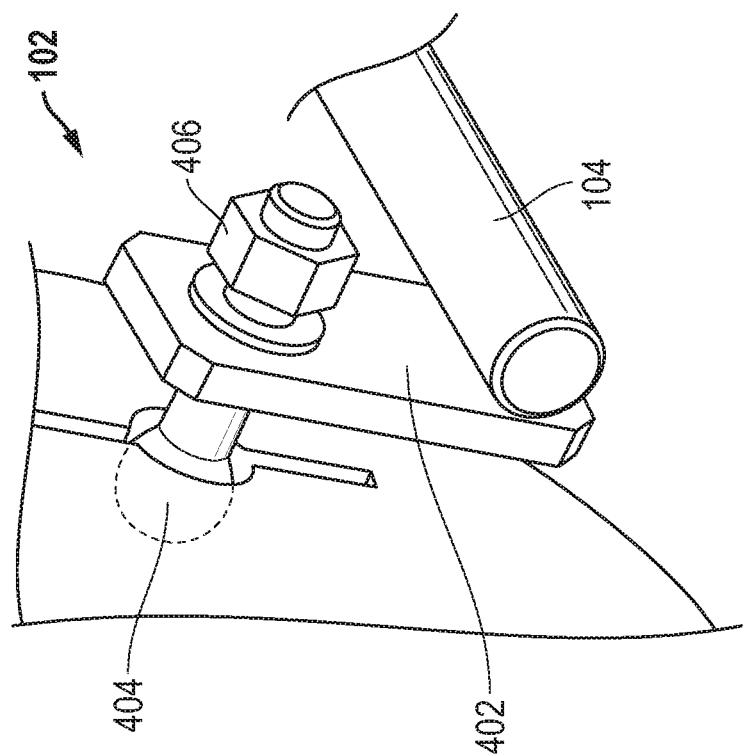
FIG. 12 is a more detailed views of the mirror mount of the detachable footrest assembly of FIGS. 1 and 2.
Figure 11:
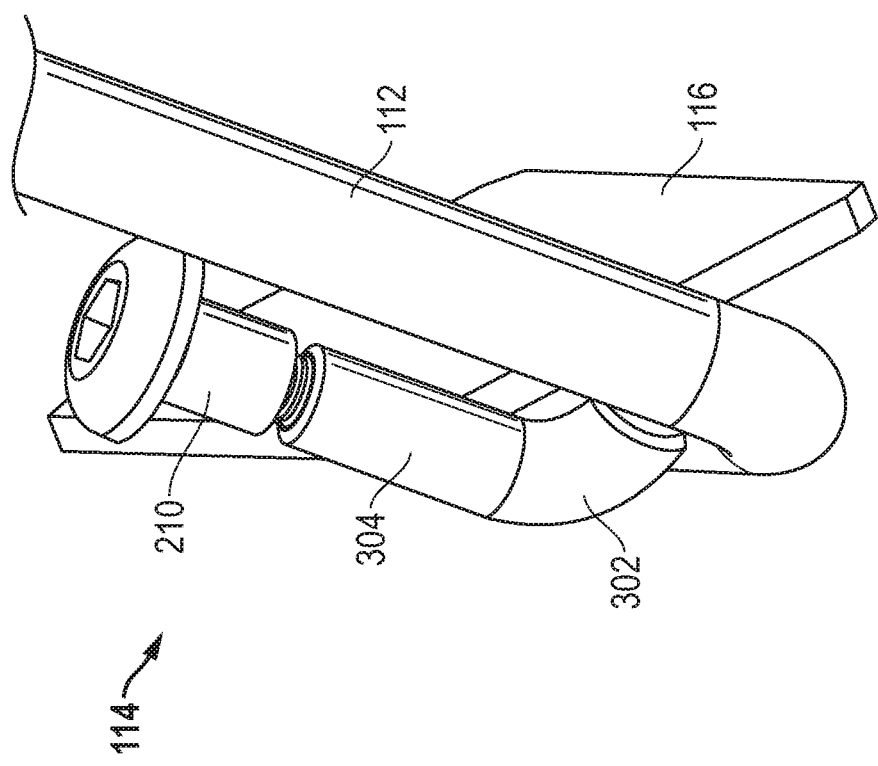
FIG. 11 is a more detailed view of the lower mount of the detachable footrest assembly of FIGS. 1 and 2.
Figure 13:
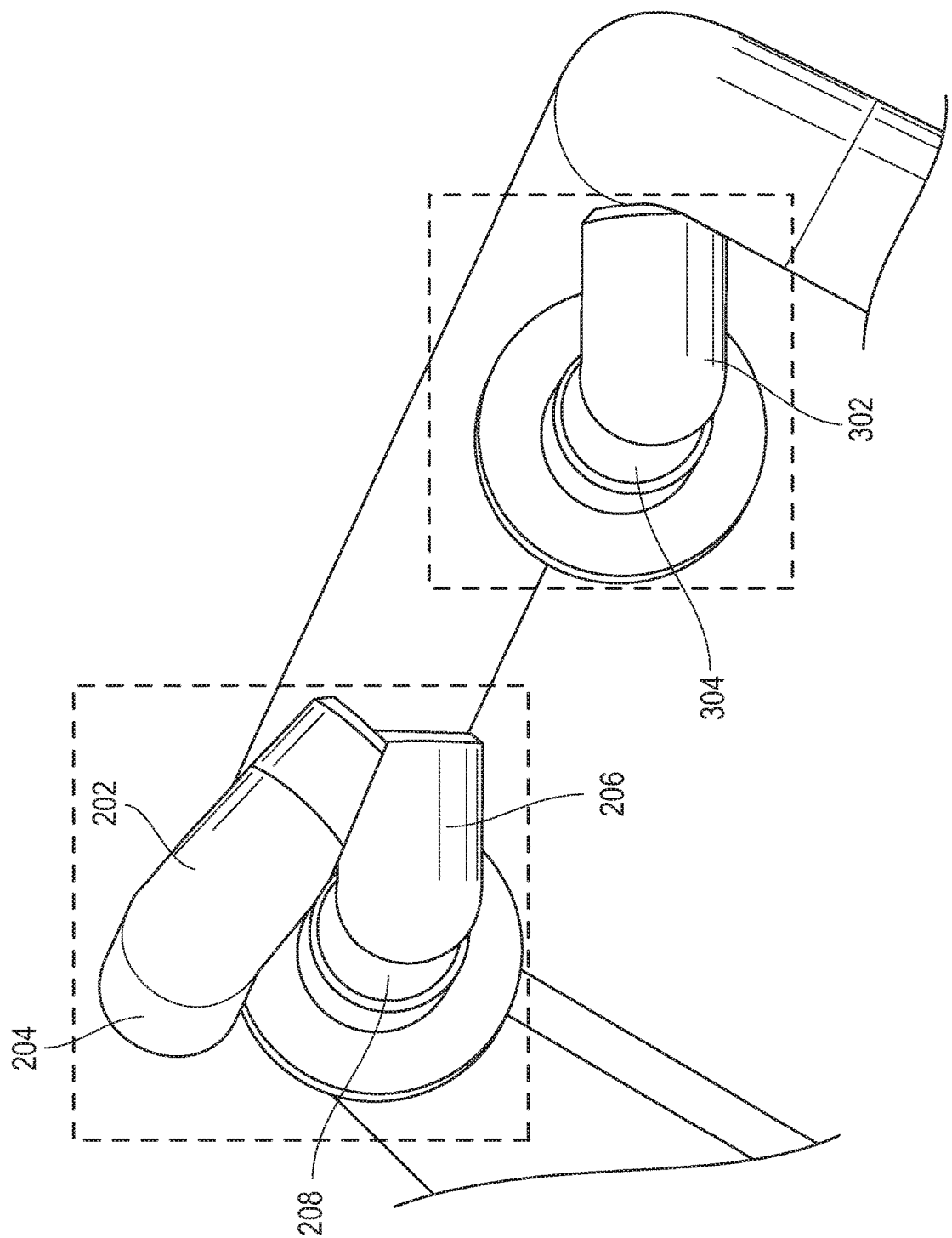
FIG. 13 is a more detailed bottom view of the upper and lower mounts of the detachable footrest assembly of FIGS. 1 and 2.

According to FIGS. 1-13, an example of detachable footrest 100 can be seen. In this example, the frame can form the central memory (or backbone) of the assembly. Typically, the frame can be generally U-shaped (or L-shaped if the upper portion is omitted) and can be formed of bend round bar stock (e.g., ½-inch diameter 316 stainless steel round bar stock). Alternatively, the frame can be formed of several different segments that are secured to one another (e.g., welded, brazed, or glued). In the examples depicted in FIGS. 1-13, the frame can be comprised of three segments or portions: the lower portion 118, intermediate portion 112, and the upper portion 104. Each of the upper portion 104 and lower portion 118 is formed in the example at a right angle or perpendicular to the intermediate member 112 (which can, for example, be about 18 inches long). Typically, the lower portion 118 can be shorter than the upper portion 114 and married to the intermediate portion 112 at a much smaller, sharper junction. For example, the transition between the intermediate portion 112 and lower portion 118 can occur over the diameter of the round bar stock (e.g., radius of curvature of about ½-inch). As an example, the overall length of the lower portion 118 (including the transition) can be about 5½ inches. In contrast and as shown in the examples of FIGS. 1-13, there is a gentler transition between the intermediate portion 112 and upper portion 104, which may occur over several occur over several inches (e.g., radius of curvature of about 4½ inches). As an example, the upper portion 104 (including the transition) can be about 8 inches. Because of the large transition between the upper portion 104 and intermediate portion 112, a reinforcement 106 can be used, which is typically oval or triangular shaped and which spans the transition. The reinforcement 106 can preferably be of the same material as the frame (e.g., 316 stainless steel) and can be secured to (e.g., welded, brazed, or glued) or integrally formed.

Then, extending from the intermediate portion or member 112 (e.g., integrally formed with or secured to), there can be mounts. 114 and 108. These upper and lower mounts 108 and 114 can be spaced part along the intermediate portion or member 112 such that they are adapted to be received in or secured to door hinges in a vehicle (e.g., such as those depicted in U.S. Pat. No. 7,980,345). When the door of the vehicle is removed, it is done so by removing fastener 210 (which, as shown in this example, is a hex binding barrel or which may be a nut). The fastener 210 can, for example, be M6×1.0. Each of these mounts 108 and 114, for example, have brackets that are, for example: (1) adapted to be inserted into the upper and lower door hinges of a vehicle; (2) adapted to engage the fastener 210; and (3) can be substantially aligned or coaxial with one another.

As shown in the example depictions of FIGS. 1-13, the bracket of mount 108 (which is adapted to be inserted into a door hinge) can have a mating portion 206 at its proximate end and pin 208 at its distal end, while the bracket of mount 114 (which is adapted to be inserted into a door hinge) can have a similar mating portion or member 302 and pin 304. The pins 208 and 304 can be threaded (e.g., M6×1.0) along at least a portion or segment at its distal end and which points in a direction away from the lower portion 118 of the frame (e.g., upwardly). Additionally, mount 108 can also have an additional bracket (which can have a mating portion 204 and pin 202 and which also points in a direction away from lower portion 118 of the frame); this additional bracket can be positioned at the same position along the intermediate portion 112 of the frame but separated by an angle—which allows the additional bracket to rest against the body of the vehicle and provide additional stability. The brackets of mounts 108 and 114 may be secured (e.g., welded, glued, or brazed) to the intermediate member or segment 112. Additionally, the brackets of mounts 108 and 114 can be formed of several portions (e.g., 206 and 208) that are integrally formed or individual items that are secured to one another (e.g., brazed, welded, or glued). As depicted in the example shown in FIGS. 1-13, the brackets of mounts 108 and 114 can be formed of ¼-inch diameter steel round bar stock (e.g., 316 stainless steel) where the bar stock is bent to form mating members 302, 204, and 206. It should also be note that the lower mount 114 is positioned to be closer to or proximate to the lower portion 118 than it is to the upper portion 104.

In addition to both mounts 108 and 114 and the frame, the assembly 100 can also include a footrest 116 and mirror mount 102. The footrest 116 can have several shapes so long as the shape is of sufficient size to accommodate a range of foot sizes of adults. In the example depicted in FIGS. 1-13, the foot rest 116 is shown as being substantially rectangular plate (e.g., about 2-inches by 4-inches by ⅛-inch) having chamfered corners. The footrest 116 can be integrally formed with or (as depicted in the example of FIGS. 1-13) can be secured (e.g., welded, brazed, glued, or bolted) to the lower portion or segment 118 of the frame. The mirror mount 102 can be positioned at the distal end of upper portion or segment 118 and can be formed of a main body 402 and a ball joint pin 404. The main body 402 as shown in the example of FIGS. 1-13 can be a generally rectangular plate (e.g., about 1-inch by 2-inches by 3/16-inch) with chamfered corners that may be integrally formed with or secured to the upper portion 104 of the frame at its proximate end. An opening can be formed in the main body 402 along its vertical centerline and proximate to its distal end. For example, the opening may be positioned along the vertical centerline about ½-inch from the distal end while having a about ¼-inch diameter. Typically, the opening can be threaded so that the ball joint pin 404 can be screwed in and secured by nut 406; alternatively, the opening can provide a slip fit for ball joint pin 404. A mirror 110 (which is shown in relief in example of FIGS. 1-13) can then be secured to the ball joint pin 404.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features may be employed without a corresponding use of the other features. Accordingly, it is appropriate that the appended claims be construed broadly and in a manner consistent with the scope of the invention.

The invention claimed is:

1. An apparatus comprising:
   a frame having a first portion, a second portion, a third portion, and a reinforcing portion, wherein the first portion has a first end and a second end, and wherein the first portion extends from the second portion at the first end, and wherein the third portion that extends from the first portion at the second end, and wherein the reinforcing portion extends between the first and third portions;
   a footrest extending from the first portion of the frame;
   a first mount positioned such that the first mount is adapted to be received into a lower door hinge of a vehicle, wherein the first mount has:
      a first mating portion that extends from the frame proximate to the first portion of the frame; and
      a first pin that extends from the first mating portion and that is threaded at its distal end, wherein the first pin extends in a direction away from the first portion of the frame;
   a second mount that is spaced apart from the first mount and positioned such that the second mount is adapted to be received into an upper door hinge of a vehicle, wherein the second mount has:
      a second mating portion that extends from the frame;
      a second pin that extends from the second mating portion and that is threaded at its distal end, wherein the second pin extends in a direction away from the first portion of the frame, and wherein the first and second pins are substantially aligned;
      a third mating portion that extends from the frame, wherein the second and third mating portions at positioned at an angle to one another; and
      a third pin that extends from the third mating portion.

2. The apparatus of claim 1, wherein the first and third portions are generally parallel to one another and perpendicular to the second portion, and wherein the frame is formed from a rod.

3. The apparatus of claim 1, wherein the apparatus further comprises a third mount that is secured to the third portion of the frame at its distal end, wherein the third mound is adapted to be coupled to a mirror.

4. The apparatus of claim 3, wherein the third mount further comprises:
   a main body having an opening; and
   a ball joint pin secured in the opening of the main body.

5. The apparatus of claim 1, wherein the first, second, and third mating portions are secured to the second portion of the frame by welding, brazing, or gluing.

6. The apparatus of claim 1, wherein the footrest is secured by welding, brazing, or gluing.

7. An apparatus comprising:
   a generally L-shaped frame having a lower portion and an intermediate portion;
   a footrest that is secured to lower portion for the frame;
   a lower bracket that is positioned such that it is adapted to engage a lower door hinge of a vehicle;
   a second bracket that is spaced apart from the first bracket and positioned such that the second bracket is adapted to be received into an upper door hinge of a vehicle, and wherein the first and second brackets are substantially aligned, wherein each of the upper and lower brackets have:
      a first portion that is secured to the intermediate portion of the frame;
      a second portion that extends from the first portion of the corresponding bracket in a direction away from the lower portion of the frame; and
      a third portion that extends from the second portion of the corresponding bracket, wherein the third portion is threaded;
   a third bracket that is secured to the intermediate portion of the frame proximate to the second bracket and secured at an angle to the second bracket, wherein the third bracket includes:
      a first portion that is secured to the intermediate portion of the frame; and
      a second portion that extends from the first portion of the third bracket.

8. The apparatus of claim 7, wherein the frame is generally U-shaped with an upper portion that is generally parallel to the lower portion.

9. The apparatus of claim 8, wherein the apparatus further comprises a reinforcement that secured to the upper and intermediate portions of the frame at the corner between the two.

10. The apparatus of claim 9, wherein the apparatus further comprises a mirror mount that is secured to the upper portion of the frame.

11. The apparatus of claim 10, wherein the mirror mount further comprises:
- a main body having an opening; and
- a ball joint pin secured in the opening of the main body.

12. The apparatus of claim 7, wherein the frame is comprised of a rod, which is bent to form the lower and intermediate portions.

13. The apparatus of claim 7, wherein the first, second, and third brackets are formed of rods that are bent to form their respective first and second portions.

14. The apparatus of claim 7, wherein the first, second, and third brackets are secured by welding, brazing, gluing, or bolting.

15. An apparatus comprising:
- a first bar that is bent to form a generally U-shaped frame with a lower portion, an upper portion and an intermediate portion;
- a footrest that is welded to the lower portion of the frame;
- a reinforcement that is welded to the frame at the corner between the intermediate and upper portions;
- second and third bars that each have first and second ends, wherein each of the second and third bars has a bend at its first end which is welded to the intermediate portion of the frame, and wherein each of the second and third bars is threaded along at least a portion of its length, and wherein the second and third bars are position such that the second and third bars, respectively, are adapted to be received into upper and lower door hinges of a vehicle, and wherein the second and third bars are substantially aligned with one another, and wherein the second and third bars point in a direction away from the lower portion of the frame; and
- a fourth bar having first and second ends, wherein the fourth bar has a bend at its first end which is welded to the intermediate portion of the frame at position proximate to and at an angle to the second bar.

16. The apparatus of claim 15, wherein the footrest is substantially rectangular.

17. The apparatus of claim 16, wherein the apparatus further comprises a mirror mount that is welded to the upper portion of the frame.

18. The apparatus of claim 17, wherein the mirror mount further comprises:
- a substantially rectangular body that is welded to the upper portion of the frame, wherein the body includes a port; and
- a ball joint pin secured in the opening of the body.

* * * * *